(12) United States Patent
Mullen et al.

(10) Patent No.: US 7,671,169 B2
(45) Date of Patent: Mar. 2, 2010

(54) POLYCARBONATE-POLYESTER BLOCK COPOLYMER COMPOSITIONS, METHODS, AND ARTICLES

(75) Inventors: Brian Mullen, Mt. Vernon, IN (US); Tara Mullen, Mt. Vernon, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 280 days.

(21) Appl. No.: 11/755,817

(22) Filed: May 31, 2007

(65) Prior Publication Data

US 2008/0300379 A1 Dec. 4, 2008

(51) Int. Cl.
*C08G 63/00* (2006.01)
*C08G 64/00* (2006.01)

(52) U.S. Cl. .......... 528/279; 525/67; 525/146; 525/147; 525/411; 528/196; 528/198; 528/282; 528/283

(58) Field of Classification Search .......... 525/67, 525/146, 147, 411; 528/196, 198, 279, 282, 528/283
See application file for complete search history.

(56) References Cited

U.S. PATENT DOCUMENTS

| | | |
|---|---|---|
| 4,814,421 A | 3/1989 | Rosenquist |
| 4,933,424 A | 6/1990 | Rosenquist |
| 5,196,245 A | 3/1993 | DeRudder et al. |
| 5,321,064 A | 6/1994 | Vaidya et al. |
| 5,847,011 A | 12/1998 | Terado et al. |
| 6,740,730 B1 | 5/2004 | Kratschmer et al. |
| 2007/0135569 A1 | 6/2007 | DeRudder |

OTHER PUBLICATIONS

Kricheldorf et al., "Poly(lactones). 9. Polymerization Mechanism of Metal Alkoxide Initiated Polymerizations of Lactide and Various Lactones", Macromolecules, 21, (1988), pp. 286-293.
JP07-109413; Apr. 25, 1995; Patent Abstracts of Japan (1 page).
JP07-082369; Mar. 28, 1995; Patent Abstracts of Japan (1 page).
Takeshita, Shinji et al, "Fire-resistant polylactone-terminated polycarbonate compositions with improved melt flowability for thin moldings", XP002489656, Mar. 18, 1997, 2 pages.
Ebato, Hiroshi, "Preparation of lactide copolymers with good biodegradability and high melting point, for food packaging film, etc.", XP002489657, Mar. 28, 1995, 2 pages.
Hayata, Yusuke et al., "Heat-, hydrolysis-, and chemical-resistant aromatic polycarbonate-thermoplastic resin blend compositions and their electronic device cases", XP002489658, Apr. 24, 2008, 4 pages.
JP 09 071719, Publication date: Mar. 18, 1997, Abstract, 1 page.
JP 07 082369, Publication date: Mar. 28, 1995, Abstract, 1 page.

*Primary Examiner*—Terressa M Boykin

(57) ABSTRACT

A polycarbonate-polyester block copolymer includes a polycarbonate block and a polyester block, each having specific structures. The block copolymer can be prepared, at least in part, from renewable feedstocks. In some forms, the block copolymer includes biodegradable segments that facilitate structural breakdown of objects molded from the block copolymer. Methods of preparing the block copolymer are described as are compositions that include it and articles prepared from it.

39 Claims, No Drawings

POLYCARBONATE-POLYESTER BLOCK COPOLYMER COMPOSITIONS, METHODS, AND ARTICLES

BACKGROUND OF THE INVENTION

Polycarbonates and their copolymers with polyesters are known thermoplastics valued for their optical clarity as well as their physical and thermal properties. Most of the monomers used to prepare these polymers are ultimately derived from petroleum. With the projected decline in global petroleum reserves over the coming decades, there is a strong desire to identify renewable sources of starting materials for polycarbonate-polyester copolymers. Particularly for applications in which the use of an article molded from a polycarbonate-polyester copolymer is fleeting, there is also a desire for polycarbonate-polyester copolymers with biodegradable linkages that facilitate structural decomposition of the article. There is therefore a desire for new polycarbonate-polyester copolymers that can be prepared using renewable starting materials and that include biodegradable linkages.

BRIEF DESCRIPTION OF THE INVENTION

The above-described and other drawbacks are alleviated by a polycarbonate-polyester block copolymer, comprising: a polycarbonate block having the structure

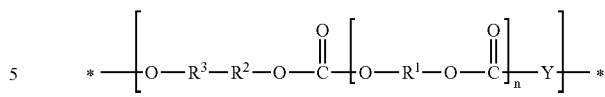

wherein each occurrence of $R^1$ is independently a $C_6$-$C_{60}$ divalent hydrocarbon group, provided that at least 60% of the $R^1$ groups comprise aromatic moieties; Y is —O— or —O—$R^2$—$R^3$—O—; each occurrence of $R^2$ is independently a $C_6$-$C_{18}$ arylene group; each occurrence of $R^3$ is independently a $C_1$-$C_{12}$ alkylene group; and n is 2 to about 200; and an aliphatic polyester block having the structure

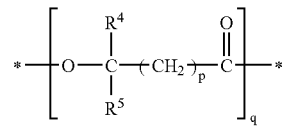

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000.

Another embodiment is a polycarbonate-polylactide block copolymer, comprising: a polycarbonate block having the structure

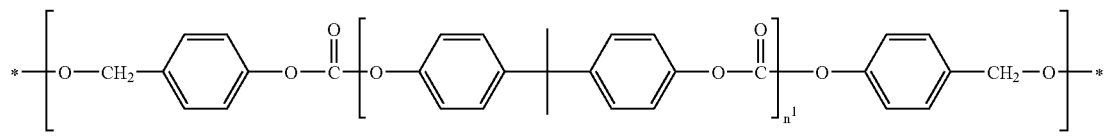

wherein $n^1$ is about 20 to about 200; and a polylactide block having the structure

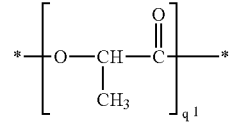

wherein $q^1$ is about 50 to about 500.

Another embodiment is a polycarbonate-polyester diblock copolymer having the structure

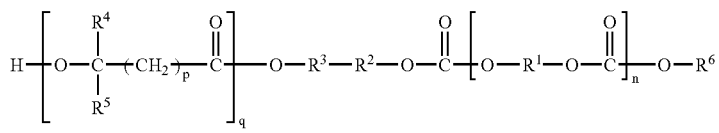

wherein each occurrence of $R^1$ is independently a $C_6$-$C_{60}$ divalent hydrocarbon group, provided that at least 60% of the $R^1$ groups comprise aromatic moieties; $R^2$ is a $C_6$-$C_{18}$ arylene group; $R^3$ is a $C_1$-$C_{12}$ alkylene group; each occurrence of $R^4$ and $R^5$ is independently hydrogen or $C_1$-$C_{12}$ alkyl; $R^6$ is $C_6$-$C_{18}$ aryl; each occurrence of p is independently 0, 1, 2, 3, 4, or 5; n is 2 to about 200; and q is 2 to about 1,000.

Another embodiment is a polycarbonate-polyester triblock copolymer having the structure

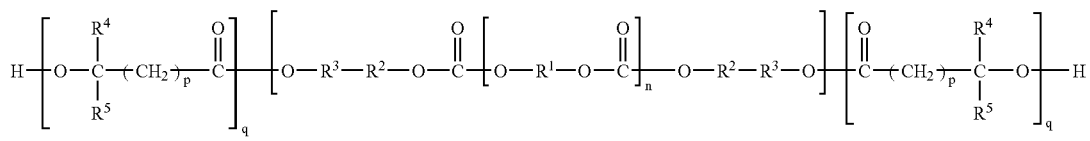

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; n is 2 to about 200; and each occurrence of q is 2 to about 1,000.

Another embodiment is a polycarbonate-polyester diblock copolymer having the structure

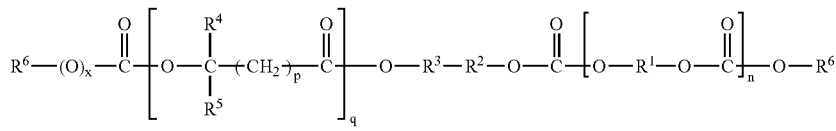

wherein each occurrence of $R^1$ is independently a $C_6$-$C_{60}$ divalent hydrocarbon group, provided that at least 60% of the $R^1$ groups comprise aromatic moieties; $R^2$ is a $C_6$-$C_{18}$ arylene group; $R^3$ is a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200; q is 2 to about 1,000; and x is 0 or 1.

Another embodiment is a polycarbonate-polyester triblock copolymer having the structure

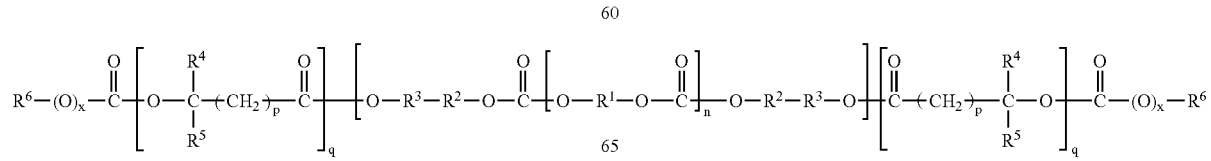

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200; each occurrence of q is 2 to about 1,000; and x is 0 or 1.

Another embodiment is a polycarbonate-polylactide diblock copolymer having the structure

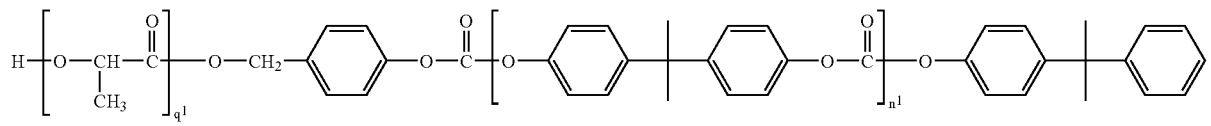

wherein $n^1$ is about 20 to about 200; and $q^1$ is about 50 to about 500.

Another embodiment is a polycarbonate-polylactide tri-block copolymer having the structure

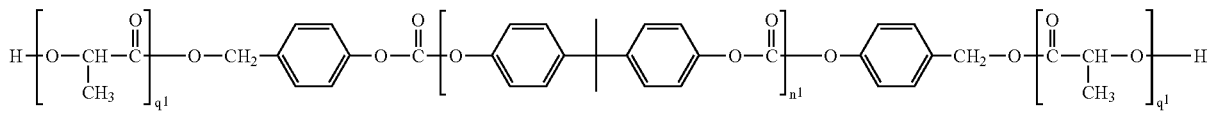

wherein $n^1$ is about 20 to about 200; and each occurrence of $q^1$ is about 50 to about 500.

Another embodiment is a polycarbonate-polylactide diblock copolymer having the structure

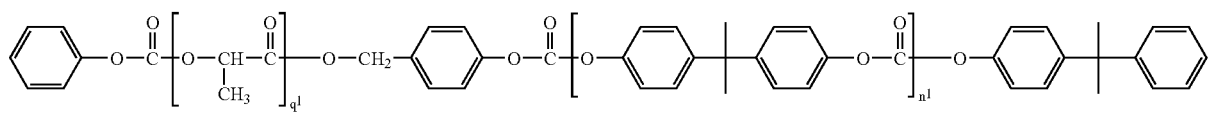

wherein $n^1$ is about 20 to about 200; and $q^1$ is about 50 to about 500.

Another embodiment is a polycarbonate-polylactide tri-block copolymer having the structure

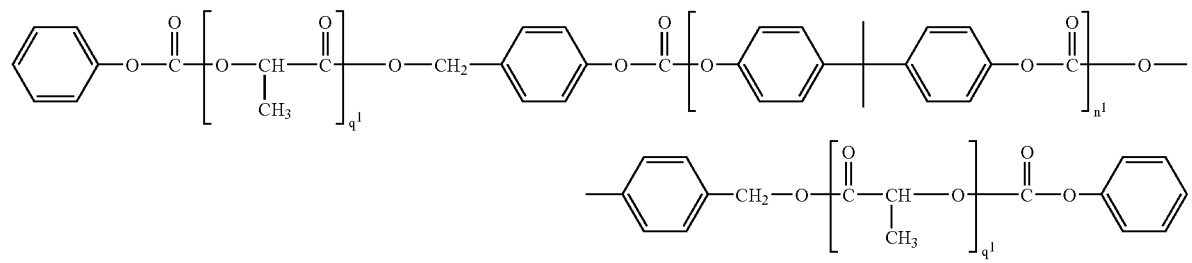

wherein $n^1$ is about 20 to about 200; and each occurrence of $q^1$ is about 50 to about 500.

Another embodiment is a composition, comprising: a polycarbonate; and a polycarbonate-polyester block copolymer comprising a polycarbonate block having the structure

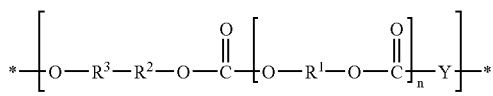

wherein each occurrence of $R^1$ is independently a $C_6$-$C_{60}$ divalent hydrocarbon group, provided that at least 60% of the $R^1$ groups comprise aromatic moieties; Y is —O— or —O—$R^2$—$R^3$—O—; each occurrence of $R^2$ is independently a $C_6$-$C_{18}$ arylene group; each occurrence of $R^3$ is independently a $C_1$-$C_{12}$ alkylene group; and n is 2 to about 200; and an aliphatic polyester block having the structure

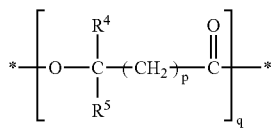

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000.

Another embodiment is a method of preparing a polycarbonate-polyester block copolymer, comprising: conducting a ring-opening polymerization of an aliphatic cyclic ester in the presence of a polycarbonate to form an uncapped polycarbonate-polyester block copolymer; wherein the polycarbonate has the structure

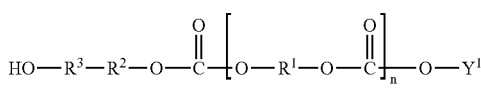

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; $Y^1$ is $C_6$-$C_{18}$ aryl or —$R^2$—$R^3$—OH; and n is 2 to about 200.

Another embodiment is a method of preparing a polycarbonate-polylactide block copolymer, comprising: conducting a ring-opening polymerization of a lactide in the presence of a polycarbonate to form an uncapped polycarbonate-polylactide block copolymer; wherein the polycarbonate has the structure

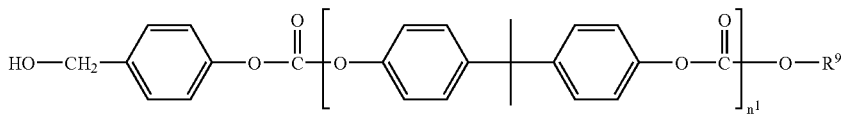

wherein $R^9$ is

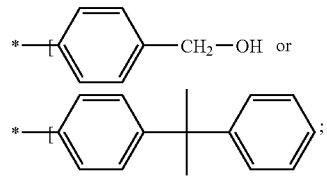

and $n^1$ is about 20 to about 200.

These and other embodiments, including articles comprising the block copolymers or block copolymer-containing compositions, are described in detail below.

DETAILED DESCRIPTION OF THE INVENTION

The present inventors have discovered that polycarbonate-polyester block copolymers can be prepared by ring-opening polymerization of a cyclic ester in the presence of a polycarbonate with at least one alcohol end group. Many of the cyclic esters suitable for use in the method can be derived from renewable resources. For example, the cyclic dimers known as lactides can be derived from corn.

One embodiment is a polycarbonate-polyester block copolymer, comprising: a polycarbonate block having the structure

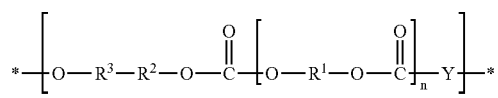

wherein each occurrence of $R^1$ is independently a $C_6$-$C_{60}$ divalent hydrocarbon group, provided that at least 60% of the $R^1$ groups comprise aromatic moieties; Y is —O— or —O—$R^2$—$R^3$—O—; each occurrence of $R^2$ is independently a $C_6$-$C_{18}$ arylene group; each occurrence of $R^3$ is independently a $C_1$-$C_{12}$ alkylene group; and n is 2 to about 200; and an aliphatic polyester block having the structure

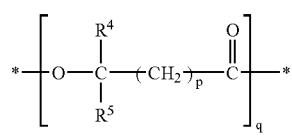

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000.

In the context of the polycarbonate block, the number of repeat units n can be 2 to about 200, specifically about 20 to about 200, more specifically about 20 to about 100, still more specifically about 20 to about 50. With respect to the divalent group $R^1$ in the polycarbonate repeat unit, at least about 60 percent of the total number of $R^1$ groups contain aromatic moieties, and the balance thereof are aliphatic or alicyclic. In one embodiment, each $R^1$ is a $C_6$-$C_{30}$ aromatic group, which is a group that contains at least one aromatic moiety. $R^1$ can be derived from a dihydroxy compound of the formula HO—$R^1$—OH, in particular a dihydroxy compound of the formula

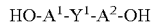

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. In one specific embodiment, the polycarbonate is a linear homopolymer derived from bisphenol A, in which each of $A^1$ and $A^2$ is p-phenylene and $Y^1$ is isopropylidene. In this embodiment, $R^1$ has the structure

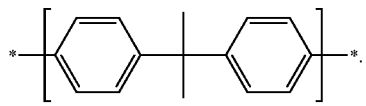

In some embodiments, each $R^1$ can be derived from a dihydroxy aromatic compound of the formula

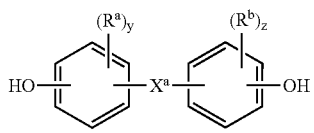

wherein $R^a$ and $R^b$ each represent a halogen or $C_1$-$C_{12}$ alkyl group and can be the same or different; and y and z are each independently integers of 0, 1, 2, 3, 4, or 5. It will be understood that $R^a$ is hydrogen when y is 0, and likewise $R^b$ is hydrogen when z is 0. Also, $X^a$ represents a bridging group connecting the two hydroxy-substituted aromatic groups, where the bridging group and the hydroxy substituent of each $C_6$ arylene group are disposed ortho, meta, or para to each other on the $C_6$ arylene group. In one embodiment, the bridging group $X^a$ is single bond, —O—, —S—, —S(O)—, —S(O)$_2$—, —C(O)—, or a $C_1$-$C_{18}$ unsubstituted or substituted hydrocarbylene group. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms such as halogens, oxygen, nitrogen, sulfur, silicon, or phosphorous over and above the carbon and hydrogen members of the substituent residue. The $C_1$-$C_{18}$ hydrocarbylene group can be disposed such that the $C_6$ arylene groups connected thereto are each connected to a common alkylidene carbon or to different carbons of the $C_1$-$C_{18}$ hydrocarbylene group. In one embodiment, y and z are each 1, and $R^a$ and $R^b$ are each a $C_1$-$C_3$ alkyl group, specifically methyl, disposed meta to the hydroxy group on each arylene group.

In one embodiment, $X^a$ is a substituted or unsubstituted $C_3$-$C_{18}$ cycloalkylidene; a $C_1$-$C_{25}$ alkylidene of formula —C($R^c$)($R^d$)— wherein $R^c$ and $R^d$ are each independently hydrogen, $C_1$-$C_{12}$ alkyl, $C_3$-$C_{12}$ cycloalkyl, $C_7$-$C_{12}$ arylalkyl, $C_1$-$C_{12}$ heteroallyl, or cyclic $C_7$-$C_{12}$ heteroarylalkyl, or a group of the formula —C(=$R^e$)— wherein $R^e$ is a divalent $C_1$-$C_{12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of the formula

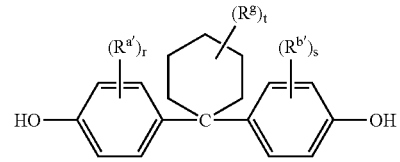

wherein $R^{a'}$ and $R^{b'}$ are each independently $C_1$-$C_{12}$ alkyl, $R^g$ is $C_1$-$C_{12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In an embodiment, $R^{a'}$ and $R^{b'}$ are each independently $C_1$-$C_4$ alkyl, $R^g$ is $C_1$-$C_4$ allyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (for example, 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In another embodiment, $X^a$ is a $C_1$-$C_{18}$ alkylene group, a $C_3$-$C_{18}$ cycloalkylene group, a fused $C_6$-$C_{18}$ cycloalkylene group, or a group of the formula —$B^1$—W—$B^2$— wherein $B^1$ and $B^2$ are the same or different $C_1$-$C_6$ alkylene group and W is a $C_3$-$C_{12}$ cycloalkylidene group or a $C_6$-$C_{16}$ arylene group.

$X^a$ can also be a substituted $C_{3-18}$ cycloalkylidene of the formula

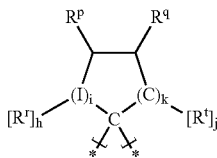

wherein $R^r$, $R^p$, $R^q$, and $R^t$ are independently hydrogen, halogen, oxygen, or a $C_1$-$C_{12}$ unsubstituted or substituted hydrocarbyl group; I is a direct bond, a carbon, or a divalent oxygen, sulfur, or —N(Z)- where Z is hydrogen, halogen, hydroxy, $C_1$-$C_{12}$ alkyl, $C_1$-$C_{12}$ alkoxy, or $C_1$-$C_{12}$ acyl; h is 0, 1, or 2, provided that h is 0 when I is a direct bond, a divalent oxygen, sulfur, or —N(Z)-; j is 1 or 2; i is 0 or 1; and k is 0, 1, 2, or 3, provided that at least two of $R^r$, $R^p$, $R^q$, and $R^t$ taken together are a fused cycloaliphatic, aromatic, or heteroaromatic ring. It will be understood that where the fused ring is aromatic, the ring as shown in the preceding structure will have an unsaturated carbon-carbon linkage where the ring is fused. When k is one and i is 0, the ring as shown in the preceding structure contains 4 carbon atoms, when k is 2, the ring as shown in the preceding structure contains 5 carbon atoms, and when k is 3, the ring contains 6 carbon atoms. In one embodiment, two adjacent groups (for example, $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, that is, a ketone.

Other useful aromatic dihydroxy compounds of the formula HO—$R^1$—OH include compounds of the formula

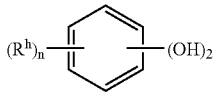

wherein each $R^h$ is independently a halogen atom, a $C_1$-$C_{10}$ hydrocarbyl such as a $C_1$-$C_{10}$ alkyl group, a halogen-substituted $C_1$-$C_{10}$ alkyl group, a $C_6$-$C_{10}$ aryl group, or a halogen-substituted $C_6$-$C_{10}$ aryl group, and n is 0 to 4. In some embodiments, the halogen is bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Further examples of bisphenol compounds include 1,1-bis (4-hydroxyphenyl)methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. The polycarbonate block may also comprise a polysiloxane-polycarbonate copolymer.

The polycarbonate block includes an $R^2$ group and an $R^3$ group at each end. Each occurrence of $R^2$ is independently a $C_6$-$C_{18}$ arylene group, and each occurrence of $R^3$ is independently a $C_1$-$C_{12}$ alkylene group. In some embodiments, $R^2$ is unsubstituted or substituted phenylene (including 1,2-phenylene, 1,3-phenylene, and 1,4-phenylene), and $R^3$ is $C_1$-$C_6$ alkylene. In some embodiments, $R^2$ is 1,4-phenylene, and $R^3$ is methylene.

The block copolymer includes at least one aliphatic polyester block having the structure

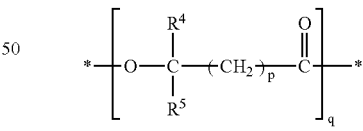

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000, specifically about 10 to about 800, more specifically about 20 to about 600. In some embodiments, each occurrence of $R^4$ and $R^5$ is hydrogen, and p has a value of 1, 2, 3, or 4. In some embodiments, each occurrence of $R^4$ is hydrogen, each occurrence of $R^5$ is hydrogen or methyl, and p is 0. In these embodiments, the polyester block is a polyglycolide ($R^5$ is hydrogen) or a polylactide ($R^5$ is methyl). When $R^4$ and $R^5$ are different, the carbon atom to which they are attached is chiral, and it may have any possible stereochemistry. For example, when $R^4$ is hydrogen and $R^5$ is methyl and p is 0, the polyester block may be a poly(L-lactide), a poly(D-lactide), or poly(rac-actide). In some embodiments, each occurrence of $R^4$ and $R^5$ is hydrogen and p is 3; in these embodiments, the polyester block is poly(6-valerolactone). In some embodiments, each occurrence of $R^4$ and $R^5$ is hydrogen and p is 4; in these embodiments, the polyester block is poly(ε-caprolactone).

In addition to the polycarbonate block and the polyester block, the polycarbonate-polyester block copolymer can, optionally, further comprising an end group (especially an end group bound to the polyester block) having the structure

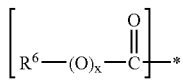

wherein $R^6$ is a $C_6$-$C_{18}$ aryl group; and x is 0 or 1. As demonstrated in the working examples below, such aromatic carbonate end groups thermally stabilize the block copolymer. Specific end groups include, for example,

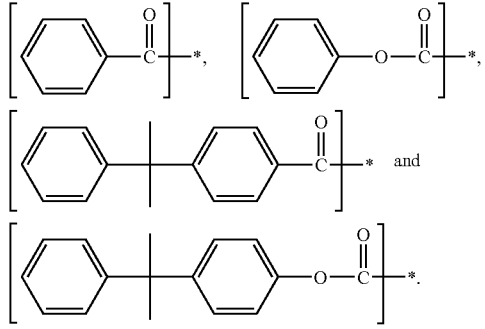

In addition to the polycarbonate block and the polyester block, the polycarbonate-polyester block copolymer can, optionally, further comprising an end group (especially an end group bound to the polycarbonate block) that is a $C_6$-$C_{18}$ aryl group. Specific $C_6$-$C_{18}$ aryl groups include, for example,

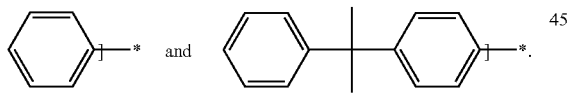

The polycarbonate-polyester block copolymer can be a diblock copolymer. That is, its polymer blocks can consist of one polycarbonate block and one polyester block. Alternatively, the polycarbonate-polyester block copolymer can be a triblock copolymer. That is, its polymer blocks can consist of one polycarbonate block, and two polyester blocks.

One embodiment is a polycarbonate-polylactide block copolymer, comprising: a polycarbonate block having the structure

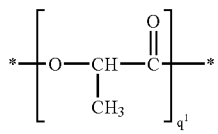

wherein $n^1$ is about 20 to about 200; and a polylactide block having the structure

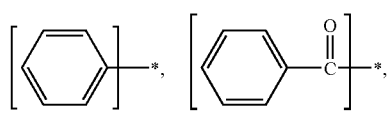

wherein $q^1$ is about 50 to about 500. This block copolymer can be a diblock copolymer in which the polymer blocks consist of one polycarbonate block and one polylactide block. Alternatively, it can be a triblock copolymer in which the polymer blocks consist of one polycarbonate block and two polylactide blocks. The polycarbonate-polylactide block copolymer may further comprise an end group having the structure

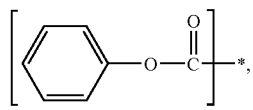

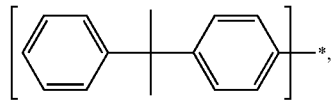

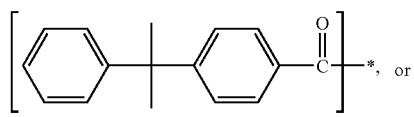

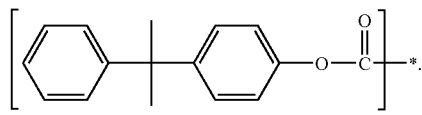

For example, the polycarbonate-polylactide block copolymer can comprise two end groups each independently having the structure

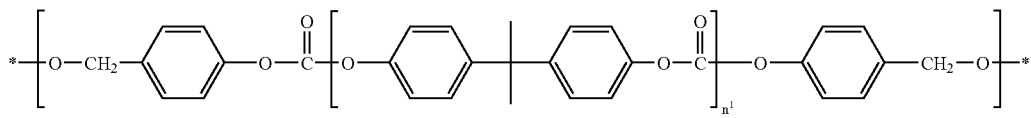

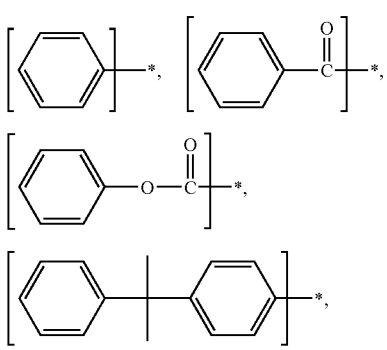

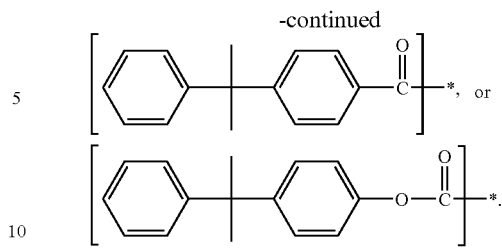

In addition to being described in terms of its component polymer blocks, the polycarbonate-polyester block copolymer may be described in terms of its complete structure. For example, in some embodiments, the polycarbonate-polyester block copolymer is a diblock copolymer having the structure

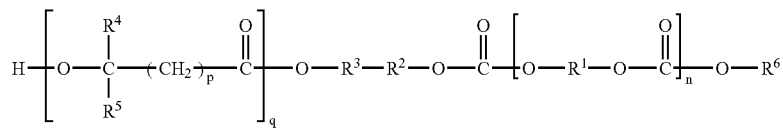

wherein each occurrence of $R^1$ is independently a $C_6$-$C_{60}$ divalent hydrocarbon group, provided that at least 60% of the $R^1$ groups comprise aromatic moieties; $R^2$ is a $C_6$-$C_{18}$ arylene group; $R^3$ is a $C_1$-$C_{12}$ alkylene group; each occurrence of $R^4$ and $R^5$ is independently hydrogen or $C_1$-$C_{12}$ alkyl; $R^6$ is $C_6$-$C_{18}$ aryl; each occurrence of p is independently 0, 1, 2, 3, 4, or 5; n is 2 to about 200, specifically about 10 to about 100, more specifically about 20 to about 50; and q is 2 to about 1,000, specifically about 10 to about 500, more specifically about 50 to about 500, more specifically about 100 to about 500, even more specifically about 150 to about 500.

In another embodiment, the polycarbonate-polyester block copolymer is an uncapped triblock copolymer having the structure

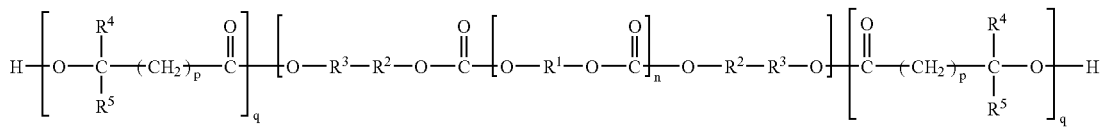

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; n is 2 to about 200, specifically about 10 to about 100, more specifically about 20 to about 50; and each occurrence of q is 2 to about 1,000, specifically about 10 to about 500, more specifically about 50 to about 500, more specifically about 100 to about 500, even more specifically about 150 to about 500.

In another embodiment, the polycarbonate-polyester block copolymer is a capped diblock copolymer having the structure

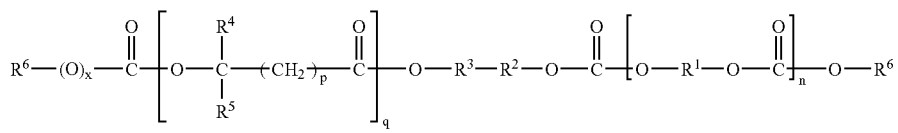

wherein each occurrence of $R^1$ is independently a $C_6$-$C_{60}$ divalent hydrocarbon group, provided that at least 60% of the $R^1$ groups comprise aromatic moieties; $R^2$ is a $C_6$-$C_{18}$ arylene group; $R^3$ is a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200, specifically about 10 to about 100, more specifically about 20 to about 50; q is 2 to about 1,000, specifically about 10 to about 500, more specifically about 50 to about 500, more specifically about 100 to about 500, even more specifically about 150 to about 500; and x is 0 or 1.

In another embodiment, the polycarbonate-polyester block copolymer is a capped triblock copolymer having the structure

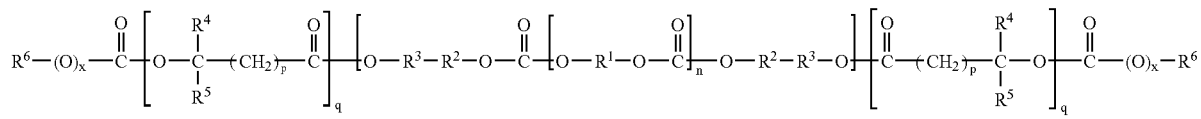

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200, specifically about 10 to about 100, more specifically about 20 to about 50; each occurrence of q is 2 to about 1,000, specifically about 10 to about 500, more specifically about 50 to about 500, more specifically about 100 to about 500, even more specifically about 150 to about 500; and x is 0 or 1.

In another embodiment, the polycarbonate-polyester block copolymer is an uncapped polycarbonate-polylactide diblock copolymer having the structure

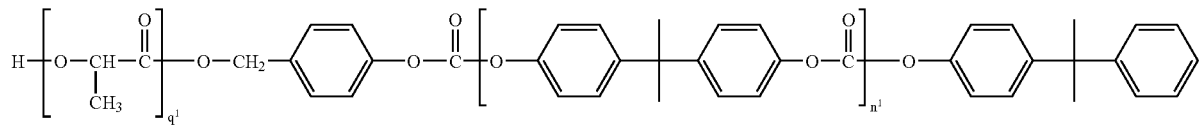

wherein $n^1$ is about 20 to about 200; and $q^1$ is about 50 to about 500.

In another embodiment, the polycarbonate-polyester block copolymer is an uncapped polycarbonate-polylactide triblock copolymer having the structure

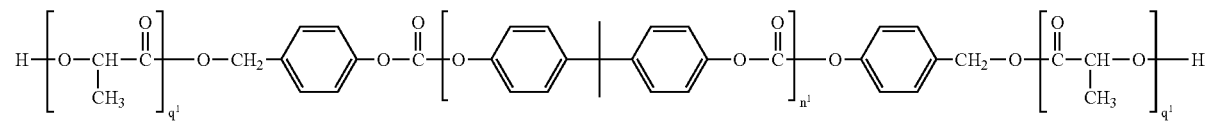

wherein $n^1$ is about 20 to about 200; and each occurrence of $q^1$ is about 50 to about 500.

In another embodiment, the polycarbonate-polyester block copolymer is a capped polycarbonate-polylactide diblock copolymer having the structure

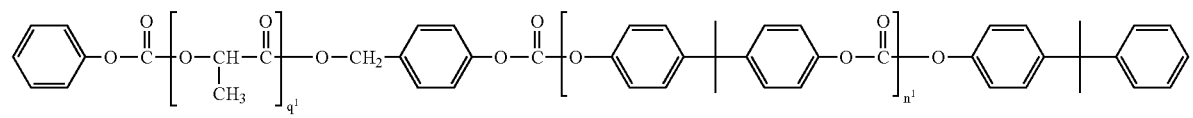

wherein $n^1$ is about 20 to about 200; and $q^1$ is about 50 to about 500.

In another embodiment, the polycarbonate-polyester block copolymer is a capped polycarbonate-polylactide triblock copolymer having the structure

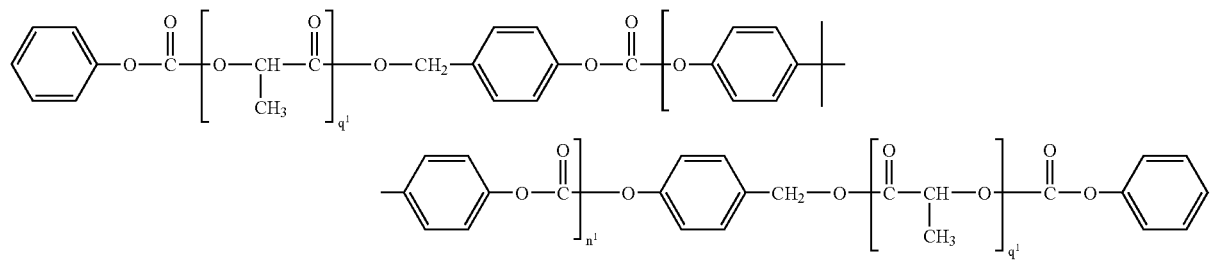

wherein $n^1$ is about 20 to about 200; and each occurrence of $q^1$ is about 50 to about 500.

Other embodiments include methods of preparing the polycarbonate-polyester block copolymer. Thus, one embodiment is a method of preparing a polycarbonate-polyester block copolymer, comprising: conducting a ring-opening polymerization of an aliphatic cyclic ester in the presence of a polycarbonate containing at least one alcohol end group to form an uncapped polycarbonate-polyester block copolymer; wherein the polycarbonate has the structure

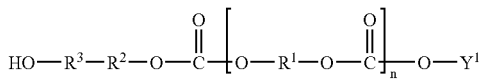

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; $Y^1$ is $C_6$-$C_{18}$ aryl or —$R^2$—$R^3$—OH; and n is 2 to about 200, specifically about 10 to about 100, more specifically about 20 to about 50.

Aliphatic cyclic esters suitable for use in the method include, for example, glycolide, lactides (including L,L-lactide, D,D-lactide, and rac-lactide), β-propiolactone, β-butyrolactone, γ-butyrolactone, δ-valerolactone, ε-caprolactone, and mixtures thereof. In some embodiments, the cyclic ester is L,L-lactide or rac-lactide.

The ring-opening polymerization is typically conducted in the presence of a catalyst. Suitable catalysts include, for example, stannous ethoxide, stannous n-butoxide, stannous octoate, magnesium ethoxide, aluminum isopropoxide, zinc n-butoxide, titanium n-butoxide, zirconium n-propoxide, dibutyltin dimethoxide, tributyltin methoxide, and mixtures thereof. Enzymatic catalysts can also be used. In some embodiments, the catalyst comprises comprising stannous octoate (also known as stannous 2-ethylhexanoate; CAS Reg. No. 301-10-0).

The ring-opening polymerization may be conducted in solution (that is, in the presence of a solvent), or in "bulk" or "melt" (that is, in the absence of a solvent). Solvents suitable for use in solution ring-opening polymerization include, for example, chlorinated solvents (including methylene chloride), tetrahydrofuran, benzene, toluene, and the like, and mixtures thereof.

The method can, optionally, further include capping the uncapped polycarbonate-polyester block copolymer. Suitable capping agents include, for example, aryl chloroformates (such as phenyl chloroformate), aromatic acid halides (such as benzoyl chloride and toluoyl chlorides), aromatic anhydrides (such as benzoic anhydride), and mixtures thereof.

One embodiment is a method of preparing a polycarbonate-polylactide block copolymer, comprising: conducting a ring-opening polymerization of a lactide in the presence of a polycarbonate with at least one alcohol end group to form an uncapped polycarbonate-polylactide block copolymer; wherein the polycarbonate has the structure wherein $R^9$ is

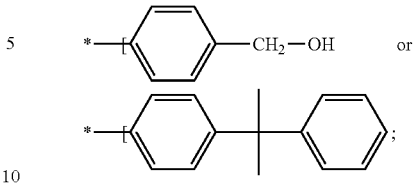

and $n^1$ is about 20 to about 200, specifically about 10 to about 100, more specifically about 20 to about 50. The method can, optionally, further comprise reacting the uncapped polycarbonate-polylactide block copolymer with phenyl chloroformate to form a phenyl carbonate-capped polycarbonate-polylactide block copolymer.

Other embodiments include compositions comprising the polycarbonate-polyester block copolymer. For example, one embodiment is a composition, comprising: a polycarbonate; and a polycarbonate-polyester block copolymer comprising a polycarbonate block having the structure

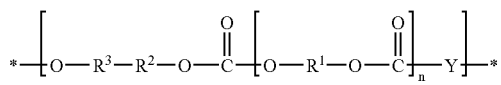

wherein each occurrence of $R^1$ is independently a $C_6$-$C_{60}$ divalent hydrocarbon group, provided that at least 60% of the $R^1$ groups comprise aromatic moieties; Y is —O— or —O—$R^2$—$R^3$—O—; each occurrence of $R^2$ is independently a $C_6$-$C_{18}$ arylene group; each occurrence of $R^3$ is independently a $C_1$-$C_{12}$ alkylene group; and n is 2 to about 200, specifically about 10 to about 100, more specifically about 20 to about 50; and an aliphatic polyester block having the structure

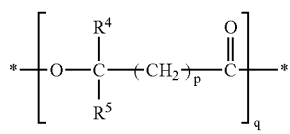

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000, specifically about 10 to about 500, more specifically about 50 to about 500, more specifically about 100 to about 500, even more specifically about 150 to about 500. Polycarbonates that are suitable for blending with the polycarbonate-polyester block copolymer include those comprising repeating units having the structure

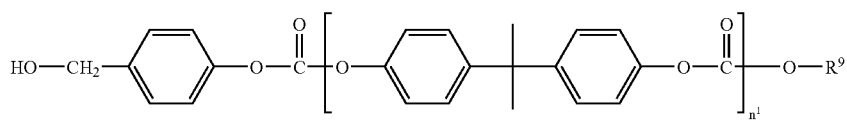

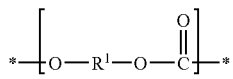

wherein $R^1$ has the same definition used above in the context of the polycarbonate block of the polycarbonate-polyester block copolymer. The polycarbonate can have an intrinsic viscosity, as determined in chloroform at 25° C., of about 0.3 to about 1.5 deciliters per gram (dl/gm), specifically about 0.45 to about 1.0 dl/gm. The polycarbonates can have a weight average molecular weight of about 10,000 to about 200,000 atomic mass units, specifically about 20,000 to about 100,000 atomic mass units, as measured by gel permeation chromatography (GPC) using a crosslinked styrene-divinylbenzene column and calibrated to polycarbonate references. GPC samples are prepared at a concentration of about 1 milligram/milliliter, and are eluted at a flow rate of about 1.5 milliliters/minute. The composition can comprise the polycarbonate and the polycarbonate-polyester block copolymer in a weight ratio of about 1:99 to about 99:1, specifically about 10:90 to about 90:10, more specifically about 20:80 to about 80:20. The composition comprising the polycarbonate and the polycarbonate-polyester block copolymer may be prepared by polymer blending methods known in the art, including solution blending and melt blending (for example, melt kneading in an extruder).

Other embodiments include articles comprising the polycarbonate-polyester block copolymer or a composition comprising the polycarbonate-polyester block copolymer. The polycarbonate-polyester block copolymer is particularly useful for fabricating articles including mobile phone A-covers (front covers), shavers, razors, notebooks, automotive and transportation parts, medical parts and housings, and disposable packaging.

The invention is further illustrated by the following non-limiting examples.

EXAMPLE 1

This example describes the preparation of a polycarbonate. The following were added into a 80 L continuously stirred tank reactor (CSTR) equipped with an overhead condenser and a recirculation pump with a flow rate of 40 L/minute: (a) Bisphenol A (5000 grams, 21.9 mole); (b) methylene chloride (26.7 L); (c) deionized water (13.5 liters), (d) 4-hydroxybenzyl alcohol (81.7 grams, 0.66 mole) (e) sodium gluconate (10 grams); and (f) triethylamine (30 grams). Phosgene (2862 grams, 28.9 moles) was added at a rate of 165 grams/minute with simultaneous addition of base (50 weight percent NaOH in deionized water) to maintain the pH of the reaction between 9 and 10. After the complete addition of phosgene, the reaction mixture was purged with nitrogen gas, and the organic layer was extracted. The organic extract was washed once with dilute hydrochloric acid (HCl), and subsequently washed with deionized water by centrifugation. The organic layer was precipitated from methylene chloride into hot steam. The polymer was dried under hot nitrogen before analysis. The polycarbonate product displayed the following characteristics: weight average molecular weight ($M_w$)=27,000, polydispersity index (PDI; $M_w/M_n$)=2.4; $T_g$=153° C.

EXAMPLE 2

This example describes the preparation of a partially capped polycarbonate. The following were added into a 80 liter CSTR equipped with an overhead condenser and a recirculation pump with a flow rate of 40 liters/minute: (a) bisphenol A (5,000 grams, 21.9 moles); (b) methylene chloride (26.7 liters); (c) deionized water (13.5 liters), (d) 4-hydroxybenzyl alcohol (61.3 grams, 0.49 moles) (e) paracumylphenol (35.9 grams, 0.17 moles), (f) sodium gluconate (10 grams); and (g) triethylamine (30 grams). Phosgene (2862 grams, 165 grams/minute, 28.9 moles) was added with simultaneous addition of base (50 weight percent NaOH in deionized water) to maintain the pH of the reaction between 9 and 10. After the complete addition of phosgene, the reaction mixture was purged with nitrogen gas, and the organic layer was extracted. The organic extract was washed once with dilute hydrochloric acid (HCl), and subsequently washed with deionized water by centrifugation. The organic layer was precipitated from methylene chloride into hot steam. The polymer was dried under hot nitrogen before analysis. The polycarbonate product displayed the following characteristics: $M_w$=34,800, PDI=3.95; $T_g$=153° C. It should be noted that polycarbonate product is expected to be a mixture of polycarbonate molecules with two 4-hydroxymethylphenyl end groups, one 4-hydroxymethylphenyl end group and one 4-cumylphenyl end group, and two 4-cumylphenyl end groups.

EXAMPLE 3

This example describes the preparation of a polycarbonate-polylactide block copolymer using a solution polymerization method.

In general, of polycarbonate-polyester copolymers were prepared by solution (that is, in the presence of solvent) or bulk (or melt; that is, in the absence of solvent) ring-opening polymerization of a cyclic ester in the presence of a polycarbonate and a catalyst for the ring-opening polymerization. The polycarbonate starting materials were crushed using a mortar and pestle and dried in an oven set at 110° C. for at least four hours. The cyclic ester monomers were kept in a refrigerator when not being used. Stannous octoate (Sn(Oct)$_2$; CAS Reg. No. 301-10-1) was used as the catalyst for the reactions. All glassware was dried overnight in an oven set at 180° C. All reactions were performed under $N_2$.

In a typical reaction, 10.0 grams of racemic lactide (rac-LA; CAS Reg. No. 95-96-5; 0.07 moles), 5 grams of crushed polycarbonate from Example 1 (0.044 millimoles), and 100 milliliters of toluene were added to a 3-necked round bottom flask equipped with a magnetic stir bar, a condenser, and a $N_2$ inlet and outlet. The solution and contents were allowed to heat to reflux until all of the reactants were completely dissolved. Once dissolved, 2.6 grams (0.56 millimoles) of a Sn(Oct)$_2$ catalyst solution diluted in toluene was injected into the reaction flask. The reaction was allowed to stir for 1 hour. The solution was allowed to cool, and the product was dissolved in methylene chloride and precipitated drop-wise into methanol. The precipitate was dried in an oven set at 110° C. The $M_w$ was measured to be 35,880 g/mol and PDI was 1.47 (relative to polycarbonate standards).

EXAMPLE 4

This example describes the preparation of a polycarbonate-polylactide block copolymer using a solution polymerization method. In a typical reaction, 5.0 grams of rac-LA (0.035 moles), 5 grams of crushed polycarbonate from Example 1 (0.044 millimoles), and 100 milliliters of toluene were added to a 3-necked round bottom flask equipped with a magnetic stir bar, a condenser, and a $N_2$ inlet and outlet. The solution and contents were allowed to heat to reflux until all of the reactants were completely dissolved. Once dissolved, 2.6 grams (0.56 millimoles) of a $Sn(Oct)_2$ catalyst solution diluted in toluene was injected into the reaction flask. The reaction was allowed to stir for 1 hour. The solution was allowed to cool, and the product was dissolved in methylene chloride and precipitated drop-wise into methanol. The precipitate was dried in an oven set at 110° C. The $M_w$ was measured to be 51,317 g/mol and PDI was 1.4 (relative to polycarbonate standards).

EXAMPLE 5

This example describes the preparation of a polycarbonate-polylactide block copolymer using a melt polymerization method. In a typical reaction, 10.0 grams of dry polycarbonate from Example 2 (1.6 millimoles) and 10.0 grams of rac-LA (0.07 mole) were charged to a 3-necked round bottom flask equipped with an overhead mechanical stirrer and a $N_2$ inlet and outlet. The flask was submersed into an oil bath thermostatted to 155° C., and the contents in the flask were stirred until completely melted. Once the contents were melted, a catalytic amount of $Sn(Oct)_2$ was added to the flask (0.25-0.5 millimole $Sn(Oct)_2$). The reaction mixture was allowed to stir for 1 hour. After the allotted time, the flask and contents were allowed to cool, and the product was dissolved in $CH_2Cl_2$ and precipitated slowly into stirring methanol. The solid was dried in an oven set at 110° C. before further characterization. The $M_w$ was measured to be 28,356 g/mol and PDI was 4.7 (relative to polycarbonate standards). Although it was unexpected that the product $M_w$ values would be less than that for the polycarbonate starting material, this may be attributable to an offset between gel permeation chromatography retention times for the polycarbonate standards and product block copolymers, which have different solubility parameters in the eluent, methylene chloride.

EXAMPLE 6

This example describes the preparation of a polycarbonate-polylactide block copolymer using a melt polymerization method. 5.0 grams of dry polycarbonate from Example 2 (0.8 millimoles) and 10.0 grams of rac-LA (0.07 moles) were charged to a 3-necked round bottom flask equipped with an overhead mechanical stirrer and a $N_2$ inlet and outlet. The flask was submersed into an oil bath thermostatted to 160° C., and the contents in the flask were stirred until completely melted. Once the contents were melted, a catalytic amount of $Sn(Oct)_2$ was added to the flask (0.25-0.5 millimole $Sn(Oct)_2$). The polymerization was allowed to stir for 1 hour. After the allotted time, the flask and contents were allowed to cool, and the product was dissolved in $CH_2Cl_2$ and precipitated slowly into stirring methanol. The solid was dried in an oven set at 110° C. before further characterization. The $M_w$ was measured to be 38,398 g/mol and PDI was 1.5 (relative to polycarbonate standards).

EXAMPLE 7

This example describes the preparation of a polycarbonate-polylactide block copolymer using a melt polymerization method. Into a 1 L 3-necked round bottom flask equipped with an overhead mechanical stirrer, a thermocouple, and a $N_2$ inlet and outlet was charged 125.0 grams of the polycarbonate from Example 2 (20 millimoles) and 125.0 grams of L,L-lactide (0.87 moles). The flask was place in a heating mantle and the thermocouple was plugged into a variable control temperature device set to a temperature of 190° C. The contents in the flask were stirred until completely melted. Once the contents were melted, a catalytic amount of $Sn(Oct)_2$ was added to the flask (5.0 millimoles $Sn(Oct)_2$). The polymerization was allowed to stir for 2 hours. After the allotted time, the flask and contents were allowed to cool, and the product was dissolved in $CH_2Cl_2$ and precipitated slowly into stirring methanol. The solid was dried in an oven set at 110° C. before further characterization. The $M_w$ was measured to be 25,801 g/mol and PDI was 3.8 (relative to polycarbonate standards).

EXAMPLE 8

This example describes chain end modification of a polycarbonate-polylactide block copolymer. Prior to the reaction, the polycarbonate-polylactide block copolymer prepared in Example 3 was dried in an oven set at 110° C. overnight. Into a 3-necked round bottom flask was charged 5 grams of the polycarbonate-polylactide block copolymer (0.41 millimoles hydroxy groups theoretically, 30 milliliters of tetrahydrofuran (THF), and 0.12 grams of phenyl chloroformate (0.77 millimoles). The reactants were allowed to stir under $N_2$, and then 0.1 grams of triethylamine (1.0 millimole) was added drop wise by syringe into the flask. The triethylammonium hydrochloride (TEA-HCl) precipitate was filtered and disposed, and the product was precipitated drop-wise into stirring excess methanol. The material was dried in an oven set at 110° C. The $M_w$ was measured to be 38,370 g/mol and PDI was 1.6 (relative to polycarbonate standards).

EXAMPLE 9

This example describes chain end modification of a polycarbonate-polylactide block copolymer. The Example 5 polycarbonate-polylactide block copolymer was transformed into a phenyl carbonate capped polycarbonate-polylactide block copolymer using the method described in Example 8. The $M_w$ was measured to be 29,110 g/mol and PDI was 2.5 (relative to polycarbonate standards).

EXAMPLE 10

This example describes chain end modification of a polycarbonate-polylactide block copolymer. Into a 1 L 3-necked round bottom flask, 80.0 grams of the Example 8 polycarbonate-polylactide block copolymer (26.8 millimoles total hydroxy groups), 500 milliliters of THF, and 4.2 grams phenyl chloroformate (26.8 millimoles) was combined and stirred until completely dissolved. Using a syringe, 3 grams of triethylamine (30 millimoles) was added drop-wise to the flask. The TEA-HCl precipitate was filtered, and the polymer was concentrated by removing approximately 250 milliliters of THF under vacuum. The polymer was precipitated into stirring methanol (1 liter). The $M_w$ was measured to be 20,953 g/mol and PDI was 3.1 (relative to polycarbonate standards).

Characterization of Polycarbonate-Polylactide Copolymers

In the above examples, several variables were adjusted to achieve a broad range of materials for testing. The monomer to initiator ratio was varied to control the molecular weight of the lactide block, and this directly affected the polycarbonate-polylactide reaction due to the fact that the initiator was one of the copolymer blocks. The reactions were done in solution or in bulk for the ring opening polymerization, and the bulk was preferred for ease of work-up. The kinetics of the ring opening of the lactide in bulk are well known, and most reaction mixtures stopped stirring within 5 to 10 minutes of the addition of Sn(Oct)$_2$ catalyst due to the high viscosity of the materials in the melt, which developed quickly upon addition of the Sn(Oct)$_2$ catalyst. Table 1 displays the properties for the materials synthesized. Glass transition temperature (T$_g$) and melting temperature (T$_m$) values were measured by differential scanning calorimetry (DSC). Onset degradation temperatures were measured by thermal gravimetric analysis (TGA) and defined as the temperature at which 99 weight percent of the material remains. Mole percent lactic acid was determined by proton nuclear magnetic resonance spectroscopy ($^1$H NMR) using integrated values of the methane protons of poly(lactic acid) versus the aromatic protons of poly(bisphenol A carbonate).

TABLE 1

| Entry | M$_w$ | PDI | Onset of Degradation Temperature (° C.) | T$_g$ (° C.) | Mole % lactic acid in copolymer |
|---|---|---|---|---|---|
| Ex. 1 | 27,000 | 2.4 | 459 | 153 | 0 |
| Ex. 2 | 34,800 | 4.0 | 459 | 153 | 0 |
| Ex. 3 | 35,880 | 1.5 | 220 | 121 | 53 |
| Ex. 4 | 51,320 | 1.4 | 262 | 134 | 24 |
| Ex. 5 | 28,360 | 3.4 | 256 | 50; 121 | 70 |
| Ex. 6 | 38,370 | 1.6 | 262 | 124 | 43 |
| Ex. 7 | 25,800 | 3.8 | 258 | n/m | 78 |
| Ex. 8 | 38,400 | 1.5 | 169 | 57 | 77 |
| Ex. 9 | 29,110 | 2.5 | 283 | 123 | 54 |
| Ex. 10 | 20,950 | 3.1 | 281 | 86; (T$_m$ = 196) | 79 |

The results indicate that the thermal decomposition temperatures were lower in the copolymers as compared to the polycarbonates of Examples 1 and 2. On the other hand, phenyl carbonate-capped polycarbonate-polylactide copolymers showed a significantly higher onset of decomposition temperatures that the non-capped copolymers. See, for example, the phenyl carbonate-capped block copolymer of Example 6 (262° C.) versus the corresponding uncapped block copolymer of Example 3 (220° C.); and the phenyl carbonate-capped block copolymer of Example 9 (283° C.) versus the corresponding uncapped block copolymer of Example 5 (256° C.).

EXAMPLE 10

This example illustrates the preparation of films comprising the polycarbonate-polylactide block copolymers. The polycarbonate-polylactide block copolymers of Examples 3 to 9 were pressed into films, and the films were translucent to opaque, indicating phase separation/immiscibility of the polylactide and polycarbonate components. In contrast, films prepared from the Example 1 and Example 2 polycarbonates were transparent. In FIG. 1, the transmission electron microscopic image for the Example 1 polycarbonate shows a single continuous phase. Also in FIG. 1, the image for the Example 4 polycarbonate-polylactide block copolymer shows a two-phase system. The lighter images in the TEM image for the polycarbonate-polylactide represent the polylactide domains, which are on the order of 10 to 100 nanometers in size. Most of the polylactide domains have a small, circular particle size, indicative of the controlled nature of the ring opening polymerization and corresponding narrow molecular weight distribution.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (for example, it includes the degree of error associated with measurement of the particular quantity).

The invention claimed is:

1. A polycarbonate-polyester block copolymer, comprising:
a polycarbonate block having the structure

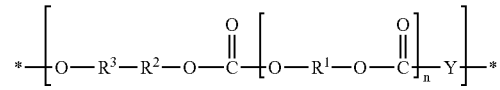

wherein each occurrence of R$^1$ is independently a C$_6$-C$_{60}$ divalent hydrocarbon group, provided that at least 60% of the R$^1$ groups comprise aromatic moieties; Y is —O— or —O—R$^2$—R$^3$—O—; each occurrence of R$^2$ is independently a C$_6$-C$_{18}$ arylene group; each occurrence of R$^3$ is independently a C$_1$-C$_{12}$ alkylene group; and n is 2 to about 200; and an aliphatic polyester block having the structure

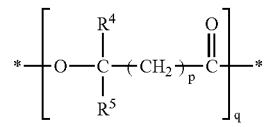

wherein each occurrence of R$^4$ and R$^5$ is independently hydrogen or C$_1$-C$_{12}$ alkyl; each occurrence of p is independently 0, 1, 2, 3, 4, or 5; and q is 2 to about 1,000;

wherein the polycarbonate-polyester block copolymer comprises a C$_6$-C$_{18}$ aryl end group or an end group having the structure

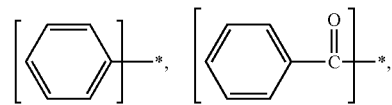

-continued

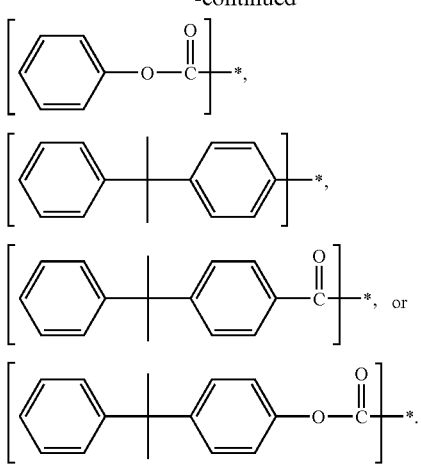

2. The polycarbonate-polyester block copolymer of claim 1, wherein $R^1$ has the structure

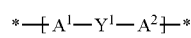

wherein $A^1$ and $A^2$ are each independently a monocyclic divalent aromatic group; and $Y^1$ is a single bond or a bridging group having one or more atoms that separate $A^1$ from $A^2$.

3. The polycarbonate-polyester block copolymer of claim 1, wherein $R^1$ has the structure

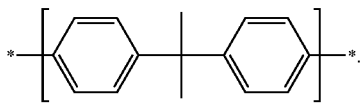

4. The polycarbonate-polyester block copolymer of claim 1, wherein $R^2$ is unsubstituted or substituted phenylene; and $R^1$ is $C_1$-$C_6$ alkylene.

5. The polycarbonate-polyester block copolymer of claim 1, wherein each occurrence of $R^2$ is 1,4-phenylene; and each occurrence of $R^3$ is methylene.

6. The polycarbonate-polyester block copolymer of claim 1, wherein each occurrence of $R^4$ is hydrogen; each occurrence of $R^5$ is hydrogen or methyl; and each occurrence of p is 0.

7. The polycarbonate-polyester block copolymer of claim 1, wherein each occurrence of $R^4$ is hydrogen; each occurrence of $R^5$ is methyl; and p is 0.

8. The polycarbonate-polyester block copolymer of claim 1, wherein each occurrence of $R^4$ and $R^5$ is hydrogen; each occurrence of $R^5$ is hydrogen or methyl; and each occurrence of p is 4.

9. The polycarbonate-polylactide block copolymer of claim 1, wherein the end group has the structure

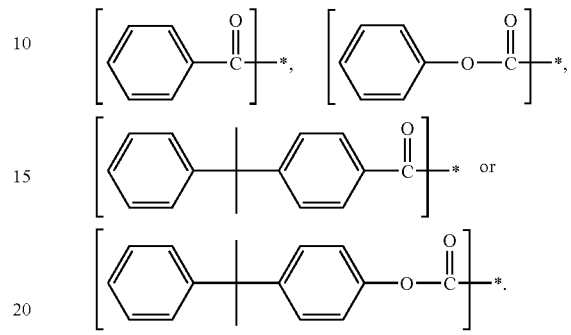

10. The polycarbonate-polyester block copolymer of claim 1, wherein the end group is a $C_6$-$C_{18}$ aryl end group.

11. The polycarbonate-polyester block copolymer of claim 1, wherein the end group is a $C_6$-$C_{18}$ aryl end group having the structure

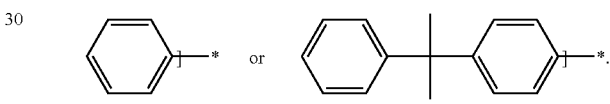

12. The polycarbonate-polyester block copolymer of claim 1, comprising polymer blocks consisting of one polycarbonate block, and one polyester block.

13. The polycarbonate-polyester block copolymer of claim 1, comprising polymer blocks consisting of one polycarbonate block, and two polyester blocks.

14. An article comprising the polycarbonate-polyester block copolymer of claim 1.

15. A polycarbonate-polylactide block copolymer, comprising:

a polycarbonate block having the structure

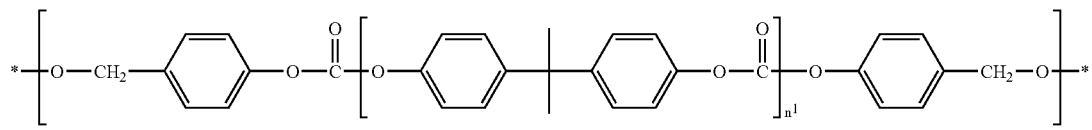

wherein $n^1$ is about 20 to about 200; and a polylactide block having the structure

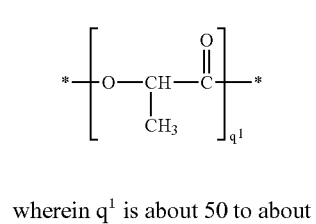

wherein $q^1$ is about 50 to about 500.

16. The polycarbonate-polylactide block copolymer of claim 15, comprising polymer blocks consisting of one polycarbonate block and one polylactide block.

17. The polycarbonate-polylactide block copolymer of claim 15, comprising polymer blocks consisting of one polycarbonate block and two polylactide blocks.

18. The polycarbonate-polylactide block copolymer of claim 15, further comprising an end group having the structure

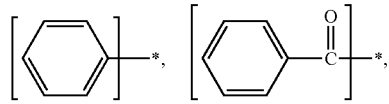

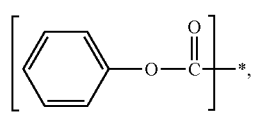

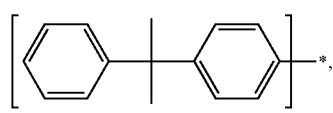

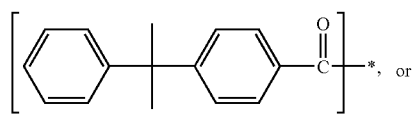

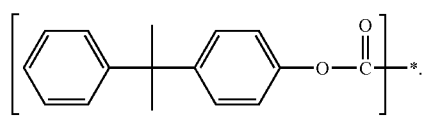

19. The polycarbonate-polylactide block copolymer of claim 15, further comprising two end groups each independently having the structure

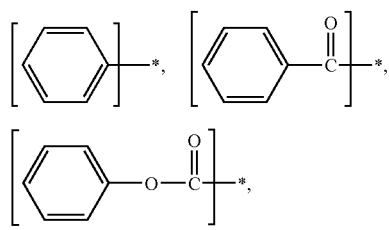

-continued

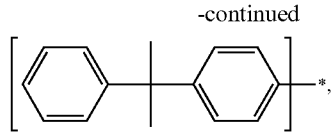

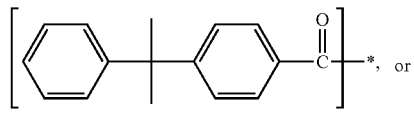

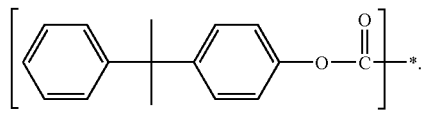

20. A polycarbonate-polyester diblock copolymer having the structure

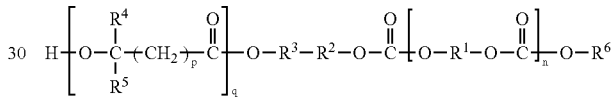

wherein each occurrence of $R^1$ is independently a $C_6$-$C_{60}$ divalent hydrocarbon group, provided that at least 60% of the $R^1$ groups comprise aromatic moieties; $R^2$ is a arylene group; $R^3$ is a $C_1$-$C_{12}$ alkylene group; each occurrence of $R^4$ and $R^5$ is independently hydrogen or $C_1$-$C_{12}$ alkyl; $R^1$ is $C_6$-$C_{18}$ aryl; each occurrence of p is independently 0, 1, 2, 3, 4, or 5; n is 2 to about 200; and q is 2 to about 1,000.

21. A polycarbonate-polyester triblock copolymer having the structure

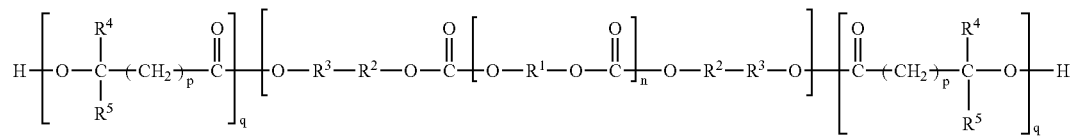

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; each occurrence of $R^4$ and $R^5$ is independently hydrogen or $C_1$-$C_{12}$ alkyl; each occurrence of p is independently 0, 1, 2, 3, 4, or 5; n is 2 to about 200; and each occurrence of q is 2 to about 1,000.

22. A polycarbonate-polyester diblock copolymer having the structure

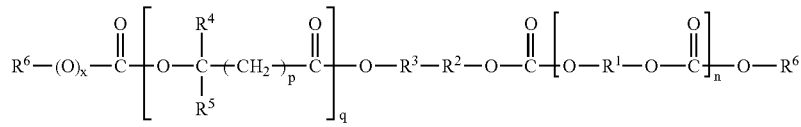

wherein each occurrence of $R^1$ is independently a $C_6$-$C_{60}$ divalent hydrocarbon group, provided that at least 60% of the $R^1$ groups comprise aromatic moieties; $R^2$ is a arylene group; $R^1$ is a $C_1$-$C_{12}$ alkylene group; each occurrence of $R^1$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200; q is 2 to about 1,000; and x is 0 or 1.

23. A polycarbonate-polyester triblock copolymer having the structure

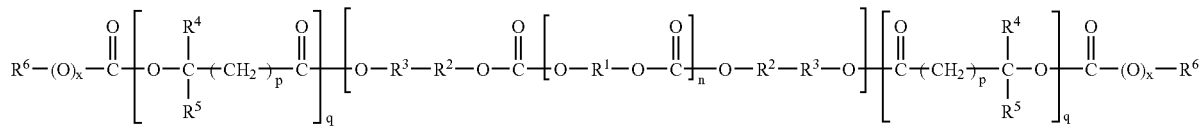

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^1$ is independently a $C_1$-$C_{12}$ alkylene group; each occurrence of $R^1$ and $R^5$ is independently hydrogen or $C_1$-$C_{12}$ alkyl; each occurrence of p is independently 0, 1, 2, 3, 4, or 5; each occurrence of $R^6$ is independently a $C_6$-$C_{18}$ aryl group; n is 2 to about 200; each occurrence of q is 2 to about 1,000; and x is 0 or 1.

24. A polycarbonate-polylactide diblock copolymer having the structure

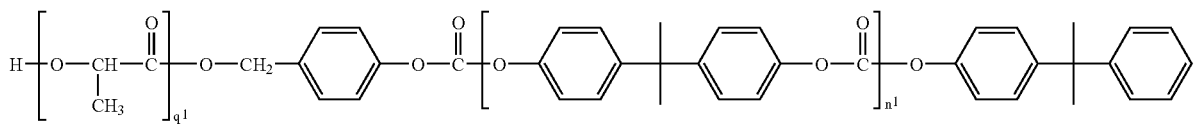

wherein $n^1$ is about 20 to about 200; and $q^1$ is about 50 to about 500.

25. A polycarbonate-polylactide triblock copolymer having the structure

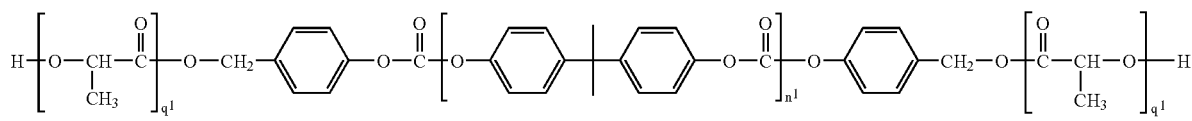

wherein $n^1$ is about 20 to about 200; and each occurrence of $q^1$ is about 50 to about 500.

26. A polycarbonate-polylactide diblock copolymer having the structure

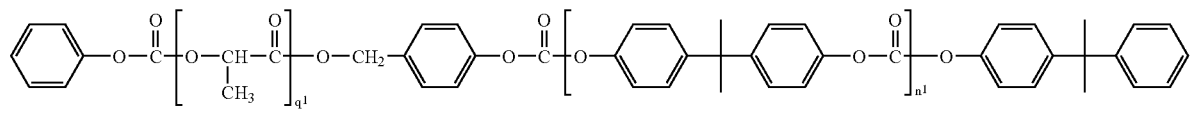

wherein $n^1$ is about 20 to about 200; and $q^1$ is about 50 to about 500.

27. A polycarbonate-polylactide triblock copolymer having the structure

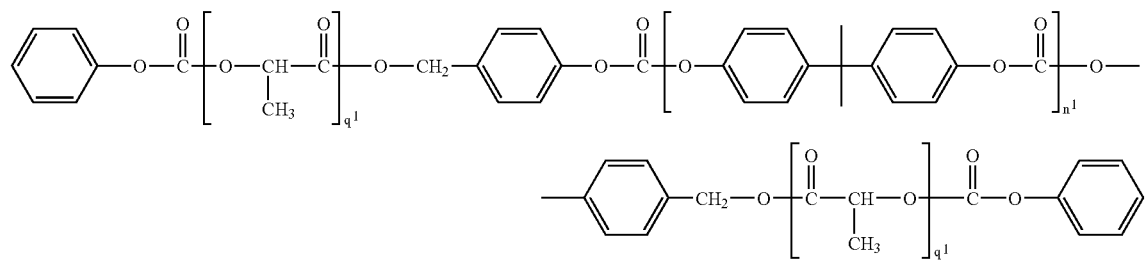

wherein $n^1$ is about 20 to about 200; and each occurrence of $q^1$ is about 50 to about 500.

28. A composition, comprising:
a polycarbonate; and
a polycarbonate-polyester block copolymer comprising
a polycarbonate block having the structure

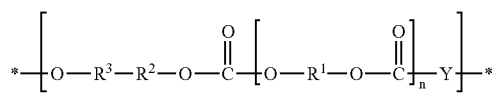

wherein each occurrence of $R^1$ is independently a $C_6$-$C_{60}$ divalent hydrocarbon group, provided that at least 60% of the $R^1$ groups comprise aromatic moieties; Y is —O— or —O—$R^2$—$R^3$—O—; each occurrence of $R^2$ is independently a $C_6$-$C_{18}$ arylene group; each occurrence of $R^3$ is independently a $C_1$-$C_{12}$ alkylene group; and n is 2 to about 200; and
an aliphatic polyester block having the structure

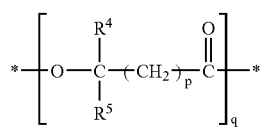

wherein each occurrence of $R^4$ and $R^5$ is independently hydrogen or $C_1$-$C_{12}$ alkyl; each occurrence of p is independently 0, 1, 2, 3, 4, or 5; and q is 2 to about 1,000;
wherein the polycarbonate-polyester block copolymer comprises a $C_6$-$C_{18}$ aryl end group or an end group having the structure

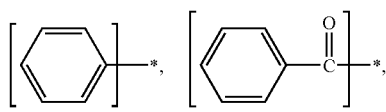

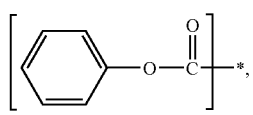

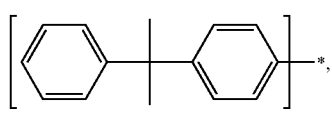

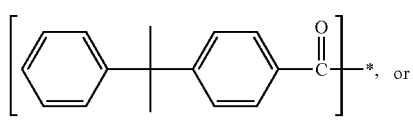

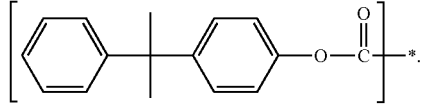

29. An article comprising the composition of claim 28.
30. A method of preparing a polycarbonate-polyester block copolymer, comprising:
conducting a ring-opening polymerization of an aliphatic cyclic ester in the presence of a polycarbonate to form an uncapped polycarbonate-polyester block copolymer;
wherein the polycarbonate has the structure

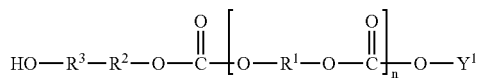

wherein each occurrence of $R^1$ is independently a $C_6$-$C_{60}$ divalent hydrocarbon group, provided that at least 60% of the $R^1$ groups comprise aromatic moieties; each occurrence of $R^2$ is independently a $C_6$-$C_{18}$ arylene group; each occurrence of $R^3$ is independently a $C_1$-$C_{12}$ alkylene group; $Y^1$ is $C_6$-$C_{18}$ aryl or —$R^2$—$R^3$—OH; and n is 2 to about 200.

31. The method of claim 30, wherein the ring-opening polymerization is conducted in the presence of a catalyst selected from the group consisting of stannous ethoxide, stannous n-butoxide, stannous octoate, magnesium ethoxide, aluminum isopropoxide, zinc n-butoxide, titanium n-butoxide, zirconium n-propoxide, dibutyltin dimethoxide, tributyltin methoxide, and mixtures thereof.

32. The method of claim 30, wherein the ring-opening polymerization is conducted in the presence of a catalyst comprising stannous octoate.

33. The method of claim 30, wherein the ring-opening polymerization is conducted in the presence of a solvent.

34. The method of claim 30, wherein the ring-opening polymerization is conducted in the absence of a solvent.

35. The method of claim 30, wherein the cyclic ester is selected from the group consisting of glycolide, lactides, β-propiolactone, β-butyrolactone, γ-butyrolactone, δ-valerolactone, ε-caprolactone, and mixtures thereof.

36. The method of claim 30, wherein the cyclic ester is L,L lactide or rac-lactide.

37. The method of claim 30, further comprising reacting the uncapped polycarbonate-polyester block copolymer with an aryl chloroformate, and aromatic acid halide, an aromatic anhydride, or a mixture thereof to form a capped polycarbonate-polyester block copolymer.

38. A method of preparing a polycarbonate-polylactide block copolymer, comprising:
conducting a ring-opening polymerization of a lactide in the presence of a polycarbonate to form an uncapped polycarbonate-polylactide block copolymer;
wherein the polycarbonate has the structure

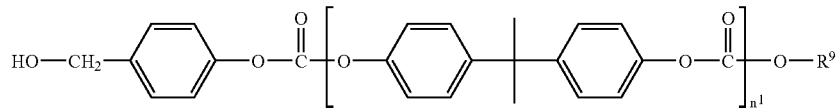

wherein $R^9$ is

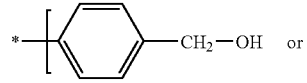 or

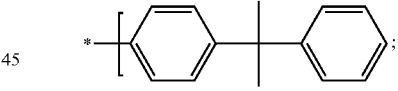;

and $n^1$ is about 20 to about 200.

39. The method of claim 38, further comprising reacting the uncapped polycarbonate-polylactide block copolymer with phenyl chloroformate to form a phenyl carbonate-capped polycarbonate-polylactide block copolymer.

* * * * *